(12) United States Patent
Allen

(10) Patent No.: US 10,806,675 B2
(45) Date of Patent: Oct. 20, 2020

(54) PALATAL DRUG DELIVERY

(71) Applicant: James Peter Allen, Bend, OR (US)

(72) Inventor: James Peter Allen, Bend, OR (US)

(*) Notice: Subject to any disclaimer, the term of this patent is extended or adjusted under 35 U.S.C. 154(b) by 298 days.

(21) Appl. No.: 15/691,572

(22) Filed: Aug. 30, 2017

(65) Prior Publication Data
US 2019/0060174 A1 Feb. 28, 2019

(51) Int. Cl.
*A61J 7/00* (2006.01)
*A61C 19/06* (2006.01)

(52) U.S. Cl.
CPC ........... *A61J 7/0015* (2013.01); *A61C 19/063* (2013.01); *A61J 7/0092* (2013.01)

(58) Field of Classification Search
CPC ....... A61C 19/00; A61C 19/06; A61C 19/063; A61J 17/0015; A61J 7/0092
See application file for complete search history.

(56) References Cited

U.S. PATENT DOCUMENTS

| | | | | |
|---|---|---|---|---|
| 1,346,998 A | * | 7/1920 | Veale | A61C 9/0006 |
| | | | | 433/35 |
| 1,406,488 A | * | 2/1922 | Pugh | A61N 5/1014 |
| | | | | 600/3 |
| 3,284,901 A | * | 11/1966 | Town | A61C 13/0025 |
| | | | | 433/188 |
| 3,827,146 A | | 8/1974 | Wallshein | |
| 3,923,064 A | | 12/1975 | Leupold | |
| 3,994,068 A | | 11/1976 | Goshgarian | |
| 4,073,296 A | | 2/1978 | McCall | |
| 4,299,568 A | | 11/1981 | Crowley | |
| 4,319,574 A | | 3/1982 | Sun et al. | |
| 4,738,259 A | | 4/1988 | Brown et al. | |
| 4,979,516 A | | 12/1990 | Abraham, II | |
| 4,983,122 A | | 1/1991 | Mitnick | |
| 5,250,067 A | | 10/1993 | Gelfer et al. | |
| 5,284,161 A | | 2/1994 | Karell | |
| 5,709,647 A | | 1/1998 | Ferber | |
| 5,735,143 A | | 4/1998 | Tanaka | |
| 5,792,067 A | | 8/1998 | Karell | |
| 5,792,176 A | | 8/1998 | Chang | |
| 6,261,306 B1 | | 7/2001 | Kramer | |
| 6,299,586 B1 | | 10/2001 | Cao | |
| 6,446,631 B1 | | 9/2002 | Hagiwara | |

(Continued)

OTHER PUBLICATIONS

FFOFR—Complete Dentures, Posterior Palatal Seal, online article Jan. 29, 2015, Foundation for Oral-facial Rehabilitation (Year: 2015).*

(Continued)

*Primary Examiner* — Bhisma Mehta
*Assistant Examiner* — James D Ponton
(74) *Attorney, Agent, or Firm* — Leber IP Law; Celia H. Leber

(57) ABSTRACT

Drug delivery devices and systems are disclosed that allow precise, controlled drug delivery via the oral palatal mucosa. The drug delivery devices can be easily used by a patient or other user, and reduce the likelihood of (or in some cases eliminate) dilution of the drug by saliva and fluids and inadvertent swallowing or unplanned uptake of the drug by the patient. The drug delivery devices include a body shaped to conform to a user's palate, and cavities in a palate-facing surface of the body that are configured to receive a drug in liquid form.

21 Claims, 2 Drawing Sheets

(56) References Cited

U.S. PATENT DOCUMENTS

| | | | |
|---|---|---|---|
| 6,505,626 B2 | 1/2003 | Kittelsen et al. | |
| 6,505,627 B2 | 1/2003 | Kittelsen et al. | |
| 6,510,853 B1 | 1/2003 | Kittelsen et al. | |
| 6,676,616 B1 | 1/2004 | Hagiwara | |
| 6,766,802 B1 | 7/2004 | Keropian | |
| 6,954,668 B1 | 10/2005 | Cuozzo | |
| 7,232,431 B1* | 6/2007 | Weimann | A61M 37/0092 604/22 |
| 7,451,767 B2 | 11/2008 | Keropian | |
| 7,610,919 B2 | 11/2009 | Utley et al. | |
| 7,861,722 B2 | 1/2011 | Keropian | |
| 7,882,839 B2 | 2/2011 | Ambis, Jr. | |
| 8,113,837 B2 | 2/2012 | Zegarelli | |
| 9,731,103 B1* | 8/2017 | Rouse | G06F 19/3456 |
| 2002/0198552 A1* | 12/2002 | Yavitz | A61B 17/244 606/161 |
| 2003/0059737 A1 | 3/2003 | Hall | |
| 2009/0078275 A1 | 3/2009 | Hegde et al. | |
| 2009/0136893 A1* | 5/2009 | Zegarelli | A61C 19/063 433/80 |
| 2009/0173352 A1 | 7/2009 | Bhat et al. | |
| 2011/0024462 A1* | 2/2011 | Teys | A47G 21/004 222/192 |
| 2011/0171592 A1 | 7/2011 | Wittbold | |
| 2011/0200972 A1* | 8/2011 | Mythen | A61B 17/244 433/217.1 |
| 2012/0037168 A1 | 2/2012 | Jackson | |
| 2012/0109051 A1 | 5/2012 | Harrell | |
| 2012/0165862 A1* | 6/2012 | Allen | A61H 39/04 606/204 |
| 2013/0298916 A1 | 11/2013 | Alvarez et al. | |
| 2014/0190491 A1 | 7/2014 | Garcia | |
| 2016/0278899 A1* | 9/2016 | Heller | A61C 19/063 |

OTHER PUBLICATIONS

Kalamir et al., "Intra-Oral Myofascial Therapy for Chronic Myogenous Temporomandiublar Disorders: a Randomized, Controlled Pilot Study", Journal of Manual and Manipulative Therapy, 2010, vol. 18, No. 3, 8 pages.

Amompong Vachiramon, DDS, DBA, Msc(OMS, MSc(Ortho) et al., "The Use of Acupuncture in Implant Dentistry", Acupuncture, Mar. 2004, 7 pages.

Goldstein, "Unconventional Dentistry: Part V, Professional Issues, Concerns and Uses", Professional Issues, Dec. 2000, 3 pages.

Schmid-Schwap et al., "Oral Acupunture in the Therapy of Craniomandibular Dysfunction Syndrome—a Randomized Controlled Trial(RCT)", Wiener Klinische Wochenshrift The Middle European Journal of Medicine, 2006, 7 pages.

Patel, et al., "Advances in Oral Transmucosal Drug Delivery", School of Pharmacy, University of Hertfordshire, Hatfield, UK AL10 9AB, MedPharm Limited, Guilford, Surrey, UK GU2 7YN, Available online Feb. 4, 2011, 39 pages.

Shakya et al., "Palatal Mucosa as a Route for Systemic Drug Delivery: A Review", Journal of Controlled Release, 151 (2011), pp. 2-9.

Aung, "Traditional Chinese Medicine in Modern Dentistry", Alternative & Complementary Therapies, Dec. 1998, 5 pages.

Phoenix et al.,"Stewart's Clinical Removable Partial Prosthodontics", 2003, pp. 475-491.

U.S. Office Action, U.S. Appl. No. 12/592,297, dated Dec. 8, 2011, 18 pages.

* cited by examiner

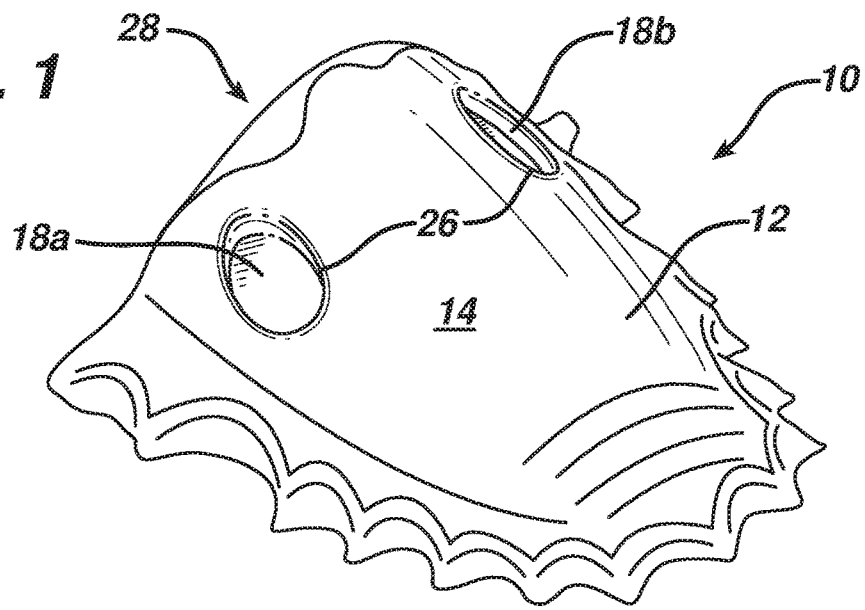
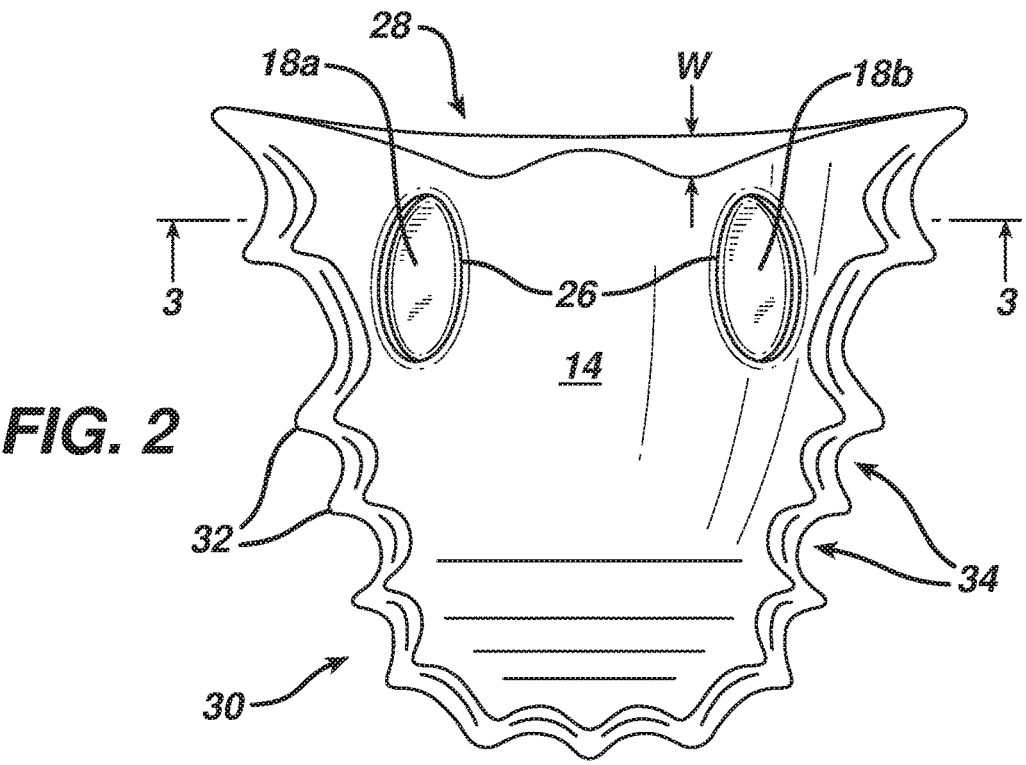
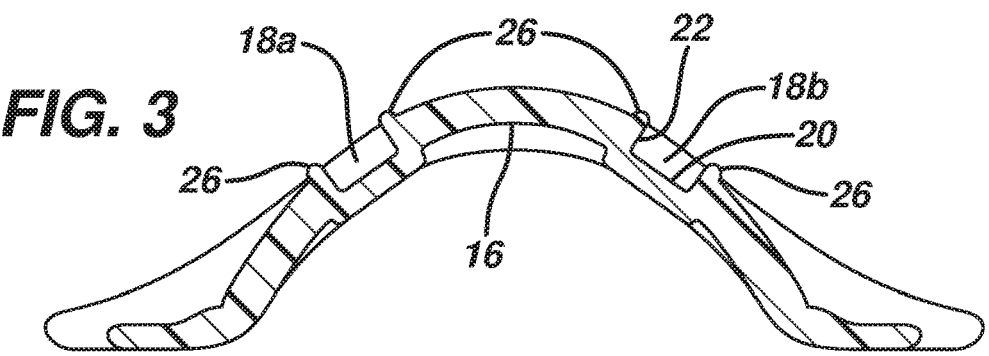

PALATAL DRUG DELIVERY

BACKGROUND

The medical community has long been studying different methods of delivering drugs to patients. Methods include oral, sub-lingual, intra-venous, dermal, ocular, by injection (e.g., intramuscular), and by inhalation, to name but a few. Each has limitations.

Oral administration has been used for centuries, in part due to its convenience for the patient and clinician. However, depending on the nature of the drug, barriers to oral administration include potential enzymatic and chemical degradation within the gastrointestinal (GI) tract, and first-pass metabolism within the liver with subsequent rapid clearance from the blood stream. These and other issues make oral administration of certain classes of drugs impossible or less than ideal. Parenteral and transdermal administration avoid these issues, but present problems of their own.

One alternative method that has been under investigation in recent years is delivery through the oral mucosa of the palate. Due to the ease of self-administration by the patient, and the avoidance of hepatic metabolism, oral transmucosal drug delivery offers a promising alternative to overcome the limitations of conventional oral drug delivery and parental administration.

The oral mucosa, due to its unique structural and physiological properties, presents a number of advantages for systemic drug delivery. Because the mucosa is highly vascularized any drug diffusing across the oral mucosa membranes has direct access to the systemic circulation via capillaries and venous drainage and can bypass hepatic metabolism and GI degradation. Moreover, the rate of blood flow through the oral mucosa is substantial.

The arterial supply of the palate is from the palatine arteries, which pass through the fovea palatine, located one on each side of the midline of the palate, and connect to the anterior portions of the palate. These vascular branches serve a wide area of the palate.

While it has been proposed to deliver drugs via the palatal mucosa using drug delivery devices that would be adhered to the mucosa, such delivery is complicated by a number of factors, including obtaining sufficient contact time for complete drug release and absorption, the impact of surrounding environmental pH, and dilution by saliva and other fluids in the mouth. Other issues include the effect on the patient of unpleasant tasting or smelling drugs, and the potential for swallowing the drug or the drug delivery device, such as a patch.

SUMMARY

The disclosure features devices, systems and methods for delivering a drug to a user via the user's palatal mucosa. The term "drug," as used herein, includes medicines, supplements, and other substances that cause a physiological change in the body.

In one aspect, the disclosure features a device comprising (a) a generally arcuate, substantially rigid body having a palate surface and a lingual surface, the body being configured to conform to and seal against the palate of a user of the device; and (b) at least one cavity formed in the palate surface of the body, wherein the cavity does not correspond to a feature of the user's palate, and the cavity is configured to receive a drug in liquid form and allow the drug to be delivered to the user via the mucosa of the palate without leakage of the drug from the cavity.

Some implementations include one or more of the following features.

The cavity includes a raised rim, elevated above the palate surface. The rim has a height of from about 0.5 to 2 mm above the surface. The body includes a post dam disposed on the palate surface. The post dam may have a height of from about 0.5 to 2 mm above the palate surface, and may include a pair of curved areas having a maximum width of from about 4 to 6 mm. The cavity may be located to correspond to an area of blood supply to the palate. In some cases, at least two cavities are formed in the palate surface of the body, which may be position to generally correspond to the locations of the user's fovea palatine.

In another aspect, the disclosure features a method of drug delivery, the method comprising (a) placing in a user's mouth a device comprising (a) a generally arcuate, substantially rigid body having a palate surface and a lingual surface, the body being configured to conform to and seal against the palate of the user; and (b) at least one cavity formed in the palate surface of the body; and (b) prior to placing the device in the user's mouth, placing in the cavity a drug, in liquid form, to be delivered to the user via the mucosa of the palate.

Some implementations of this aspect may include one or more of the following features.

In some cases the method further comprises using an indirect method to produce the body, such that the body represents a replica of the user's palate. The indirect method may include taking an impression in the user's mouth, forming a model from the impression, placing an element that is the negative of the cavity on the model, and casting a hardenable material on the model to form the device.

Alternatively, the body may comprise a heat formable or light activated material and the method may further comprise direct forming the body in the user's mouth to conform to the user's palate.

The method may further include locating the cavity on the body to correspond to a location of blood supply to the palate. In some cases, the device includes two cavities, located to correspond generally to locations of the fovea palatine of the user.

In a further aspect, the disclosure features a method of making a drug delivery device, the method comprising: (a) forming a generally arcuate, substantially rigid body having a palate surface and a lingual surface, the body being configured to conform to and seal against the palate of a user; and (b) forming at least one cavity in the palate surface of the body.

Forming the body may include taking an impression in the user's mouth, forming a model from the impression, and casting a hardenable material on the model. Forming the cavity may include placing an element that is the negative of the cavity on the model prior to casting the material on the model. Forming the cavity may also include forming a raised rim around the cavity to seal the cavity against the palate, e.g., by abrading material away from the surface surrounding the cavity. Forming the body may include forming a post dam on the palate surface.

The devices described herein allow precise, controlled drug delivery via the oral palatal mucosa. The devices can be easily used by a patient or other user, and substantially eliminate dilution of the drug by saliva and fluids and inadvertent swallowing or unplanned uptake of the drug by the patient. The devices are relatively comfortable for the patient to use, and allow a prescribed residence time of the drug against the mucosa.

The delivery systems described herein are also under the control of the patient. The patient can use the system to self-administer a drug conveniently and discreetly. Should any adverse effects be encountered the patient can easily and quickly remove the drug delivery device. Moreover, the delivery devices can be used to deliver drugs to patients who have lost their ability to swallow (e.g., patients with advanced cancer), or who have issued with their stomach and/or GI tract that interfere with absorption of orally delivered drugs.

DESCRIPTION OF THE DRAWINGS

FIG. 1 is a perspective view of a drug delivery device according to one implementation.

FIG. 2 is a top view of the device shown in FIG. 1.

FIG. 3 is a cross-sectional view of the device, taken along line 3-3 in FIG. 2.

DETAILED DESCRIPTION

Figure 4:
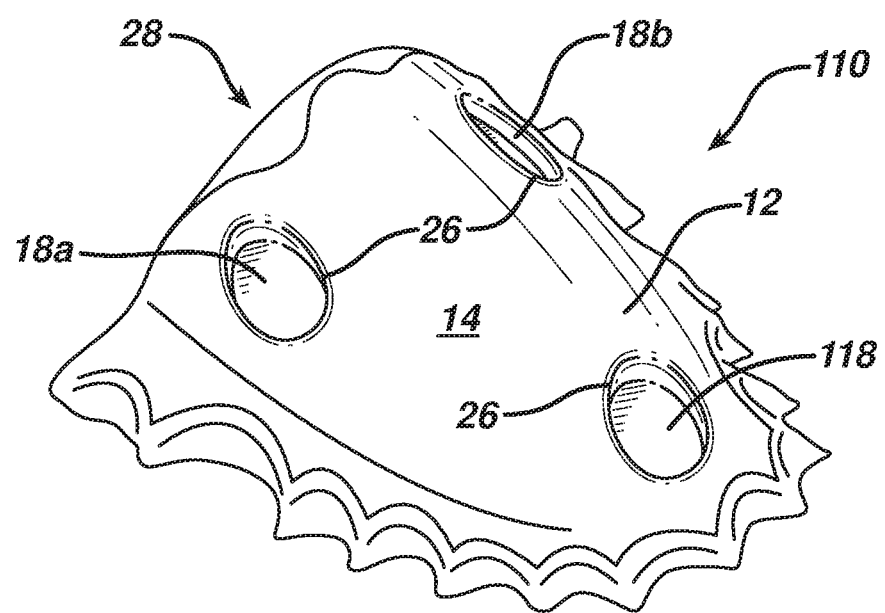
FIG. 4 is a perspective view of a drug delivery device according to an alternate implementation.

Examples of devices that can be used for drug delivery via the palatal circulatory system are discussed below.

The term "drug," as used herein, refers collectively to substances to be delivered to a recipient, including medicines and other chemicals and supplements. Drugs that can be delivered with the devices described herein include, but are not limited to, lidocaine and other anesthetics; nicotine, cocaine, and other stimulants; LSD; scopolamine; allergens; opioids, THC and other pain controlling agents; nitroglycerin; hormones and other birth control agents; steroids; amino acids; vitamins; Rivastigmine; supplements; and many other substances.

Referring to FIG. 1, a drug delivery device 10 includes a body 12, which is shaped to conform closely to the shape of the palate of a user, and which includes a palate surface 14 and a lingual surface 16 (FIG. 3). In some implementations, the device is fabricated to conform precisely to the palate, as will be discussed below. The body 12 is generally formed of a substantially rigid material.

The body 12 is shaped to conform to a palate of a user, and thus is arcuate in shape to correspond to the arcuate shape of a user's palate. The body 12 may cover a substantial portion or all of the user's palate. Body 12 is configured to be removably held adjacent to the palate, in a predetermined position relative to the location of the blood supplies on the user's palate, which in some cases may correspond to the locations of the fovea palatine. Preferably, the palate surface 14 conforms closely to the user's palate, providing a precision fit that seals against the palate surface and thus prevents dilution or contamination of the drug to be delivered by saliva or other liquids in the user's mouth, as well as inadvertent ingestion (swallowing) of the drug by the patient.

The body 12 also includes cavities 18a and 18b, which are positioned to correspond to the location of palatal blood supplies when the device is in the predetermined position, allowing drug delivery to the palatine vessels and corresponding blood supply and venous returns. Cavities 18a and 18b include a raised rim 26, best seen in FIG. 3. This rim seals against the user's palate, preventing leakage of the liquid drug (which may be highly viscous or semi-solid at room temperature, but becomes a relatively low viscosity liquid at body temperature) from the cavity. Preventing leakage is important, because many drugs should not be taken orally, due to toxicity or other concerns, and/or have a very unpleasant taste that can lead to nausea or a reluctance on the part of the patient to take the drug.

In the embodiment shown, as can be best seen in FIG. 3, the cavities 18a and 18b have a substantially planar bottom surface 20 and a side wall 22 that is substantially perpendicular to the bottom surface.

The body 12 also includes a post dam 28, extending from the palate surface along the posterior edge of the body. As is well known in the denture art, the post dam 28 extends bilaterally from the midline of the posterior edge and is shaped to be received in the pterygomaxillary notch regions of the patient's palate. The post dam thus includes two curved regions, each having a maximum width W (FIG. 2) of from about 4 to 6 mm. In some implementations the post dam has a height of from about 0.5 to 2 mm. The post dam 28 helps to hold the body securely in place, which in turn helps the rims 26 to seal firmly against the patient's palate.

In some implementations, the cavities have a depth of about 0.5 to 5 mm, e.g., about 1 to 2 mm, and a diameter of about 0.1 to 1.0 inch, e.g., about 0.5 to 0.7 inch. The cavity depth is generally determined by the volume of drug to be delivered, and is preferably sized so as not to deleteriously affect the seal between the palate surface 14 of the body and the user's palate.

Body 12 is removably held in the predetermined position without wire hooks and/or clasps (such as wire hooks and/or clasps that attach the body to a user's teeth), for example by a precision fit in the user's mouth, assisted by the post dam 28. The body is configured not to contact any side of the user's teeth, other than the palatal sides of one or more of the user's teeth, when the body is removably held in the predetermined position. For example, the body may include a perimeter (or perimeter portion) 30 that includes a plurality of ridges 32 and a plurality of depressions 34 shaped to conform to the inner sides (and/or lingual sides) of one or more of the user's teeth. This configuration helps to provide a good seal between the edge of the palate surface and the palate, which also assists in holding the device body in place and thus enhances the ability of the rims 26 to seal against the patient's palate.

In another embodiment, shown in FIG. 4, an additional cavity 118 is provided, the location of which corresponds to the location of the anterior palatine foramen and corresponding blood supplies.

In some cases, the body of the device may be formed as an oral appliance, by indirect methods and techniques. For example, an impression may be taken in the patient's mouth, from which a model is formed to provide an accurate representation of the palate. This accuracy is important in obtaining the precision fit discussed above. An element that is the negative of the desired cavity configuration (e.g., an analog washer or other disc-shaped object) is placed in the appropriate position (the area where the cavity should be positioned) on the model and adhered to the model. Then, resin (or other hardenable material) is applied to the model and cured to form the finished drug delivery device. The device will fit the patient precisely, with the cavities created on the interior surface (palate surface 14).

In some cases, a template may be used to assist the person fabricating the device in forming the rims 16.

The devices discussed herein may be fabricated using resins, polymers, metals (e.g., via casting), plastics, and/or other rigid and/or flexible material(s) and/or combinations of materials. The precise fit can be obtained using a wide variety of methods and materials used in dentistry.

OTHER EMBODIMENTS

A number of embodiments have been described. Nevertheless, it will be understood that various modifications may be made without departing from the spirit and scope of the disclosure.

For example, while it is generally preferred that the device be held in place by solely by a precision fit, in some implementations the appliance may be held or retained by wires, clasps, suction, adhesives, or cohesion. Variations in anatomy and palatal/oral defects may require additional support and retention.

While the device is generally intended for repeated use, the device may in some cases be disposable after only a few uses or even after a single use, e.g., if the device is preformed and capable of being customized by the user as discussed above.

The device may be fabricated in any desired manner, e.g., through direct methods in the mouth, e.g., with a light-activated formable material or a heat-formable material as discussed above, and/or indirect methods. In addition to the method described above as an example, indirect methods may include impressions, models, 3-D scans, radiology modeling, ultra-sound, and/or other techniques to render models and forms of the palate and other areas of the mouth. When models are used, the models may be castings, plaster, and/or digital models to be used in fabrication of the appliances.

The size and location of the cavities can be different, for example the location need not correspond to the location of the palatal foramina if drug delivery through the oral mucosa in other palatal areas would be appropriate, for example in the case of a cleft palate or a palate having bony protrusions (tori palatinus.) The cavities may have any desired shape, e.g., oblong, square, rectangular, irregular shapes, etc.

Accordingly, other embodiments are within the scope of the following claims.

What is claimed is:

1. A device comprising:
  a generally arcuate, substantially rigid body having a palate surface and a lingual surface, the body being configured to conform to and seal against the palate of a user of the device; and
  a first cavity formed in the palate surface of the body, wherein the first cavity has a bottom surface that is spaced from a facing surface of the user's palate and a raised rim, elevated above the palate surface of the body, and the first cavity is configured to receive a drug in liquid form and allow the drug to be delivered to the user via the mucosa of the palate, wherein the raised rim prevents leakage of the drug from the first cavity; wherein the first cavity is positioned to correspond to a location of the fovea palatine when the body is sealed against the palate of the user of the device.

2. The device of claim 1 wherein the rim has a height of from about 0.5 to 2 mm above the palate surface.

3. The device of claim 1 wherein the body includes a post dam disposed on the palate surface.

4. The device of claim 3 wherein the post dam has a height of from about 0.5 to 2 mm above the palate surface.

5. The device of claim 1 further comprising a second cavity formed in the palate surface of the body.

6. The device of claim 5 wherein the second cavity is positioned to correspond to a second location of the fovea palatine.

7. The device of claim 1 wherein the first cavity is located to correspond to an area of blood supply to the palate.

8. The device of claim 1 wherein the first cavity has a depth of about 0.5 to 5 mm.

9. The device of claim 1 wherein the first cavity is generally circular, and has a diameter of about 0.1 to 1.0 inch.

10. The device of claim 1 wherein the body has a perimeter that includes a plurality of ridges and depressions shaped to conform to inner sides of the user's teeth.

11. The device of claim 1 wherein the body is custom molded to a shape of the user's palate.

12. The device of claim 1 wherein the first cavity has a substantially flat bottom.

13. The device of claim 12 wherein the first cavity has a side wall that is disposed substantially perpendicular to the bottom.

14. A method of drug delivery, the method comprising:
  placing in a user's mouth a device comprising (a) a generally arcuate, substantially rigid body having a palate surface and a lingual surface, the body being configured to conform to and seal against the palate of the user; and (b) a first cavity formed in the palate surface of the body, wherein the first cavity has a bottom surface that is spaced from a facing surface of the user's palate and a raised rim, elevated above the palate surface of the body, the raised rim being configured to prevent leakage of liquid from the first cavity, and wherein the first cavity is positioned to correspond to a location of the fovea palatine when the body is sealed against the palate of the user of the device; and
  prior to placing the device in the user's mouth, placing in the first cavity a drug, in liquid form, to be delivered to the user via the mucosa of the palate.

15. The method of claim 14, further comprising using an indirect method to produce the body, such that the body represents a replica of the user's palate.

16. The method of claim 15, wherein the indirect method comprises taking an impression in the user's mouth, forming a model from the impression, placing an element that is a negative of the first cavity on the model, and casting a hardenable material on the model to form the device.

17. The method of claim 14, wherein the body comprises a heat formable or light activated material and the method further comprises direct forming the body in the user's mouth to conform to the user's palate.

18. The method of claim 14, wherein the raised rim of the first cavity is configured to seal the first cavity against the palate.

19. The method of claim 14, wherein the body includes a post dam on the palate surface.

20. The method of claim 14, further comprising locating the first cavity on the body to correspond to a location of blood supply to the palate.

21. The method of claim 14, wherein the device further includes a second cavity, and the second cavity is located to correspond generally to a second location of the fovea palatine of the user.

* * * * *